United States Patent
Souma et al.

(10) Patent No.: US 6,886,705 B2
(45) Date of Patent: May 3, 2005

(54) FUEL TANK FOR AUTOMOBILES

(75) Inventors: Satoshi Souma, Saitama (JP); Osamu Kondo, Saitama (JP); Hisayuki Goma, Saitama (JP); Shoji Uhara, Saitama (JP); Naoki Yoshikawa, Saitama (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 39 days.

(21) Appl. No.: 10/170,690

(22) Filed: Jun. 14, 2002

(65) Prior Publication Data

US 2003/0057213 A1 Mar. 27, 2003

(30) Foreign Application Priority Data

Jun. 14, 2001 (JP) .................................... P. 2001-180634

(51) Int. Cl.[7] .............................................. B65D 25/00
(52) U.S. Cl. ..................... 220/86.2; 141/301; 141/198; 137/202
(58) Field of Search ............................. 220/86.2, 86.3; 141/301, 198; 137/202

(56) References Cited

U.S. PATENT DOCUMENTS

| | | | |
|---|---|---|---|
| 3,800,978 A | | 4/1974 | Sigwal |
| 4,700,864 A | | 10/1987 | Galles et al. |
| 4,874,020 A | * | 10/1989 | Bucci ........................... 141/59 |
| 5,538,039 A | * | 7/1996 | Harde et al. ................. 137/592 |
| 5,568,828 A | * | 10/1996 | Harris ......................... 141/348 |
| 6,554,031 B2 | * | 4/2003 | Channing ...................... 141/9 |
| 6,557,595 B2 | * | 5/2003 | Ozaki .......................... 141/301 |
| 6,681,811 B2 | * | 1/2004 | Channing ...................... 141/9 |

FOREIGN PATENT DOCUMENTS

| | | |
|---|---|---|
| EP | 0 940 285 A2 | 9/1999 |
| JP | 06-64454 A | 3/1994 |
| JP | 2001-30773 | 2/2001 |
| JP | 2001-80372 | 3/2001 |

* cited by examiner

Primary Examiner—Joseph Man-Fu Moy
(74) Attorney, Agent, or Firm—Westerman, Hattori, Daniels & Adrian, LLP (57) ABSTRACT

The fuel tank includes a tank main body, a filler pipe, a first breather pipe, and a second breather pipe. The tank main body stores fuel therein. The filler pipe supplies fuel to the tank main body. The first breather pipe connects the upper space of the tank main body to the neighboring portion of a fuel supply opening. The second breather pipe connects the middle portion of the filler pipe to the neighboring portion of the fuel supply opening.

12 Claims, 7 Drawing Sheets

FUEL TANK FOR AUTOMOBILES

BACKGROUND OF THE INVENTION

The present invention relates to a fuel tank for an automobile which comprises a tank main body for storing fuel, a filler pipe for supplying the fuel to the tank main body, and a first breather pipe for connecting the upper space of the tank main body to the neighboring portion of a fuel supply opening formed in the upper end portion of the filler pipe, wherein, when an upper surface level of the fuel within the tank main body (hereinafter, referring a fuel liquid surface) is present at a given height, at least part of the filler pipe is closed by the fuel.

A filler pipe, which is used to supply fuel to the tank main body of a fuel tank for an automobile, preferably, may extend upwardly from the upper space of the tank main body in order to be able to realize smooth fuel supply. In fact, however, there exists a case in which, depending on the position of the body frame of the automobile, the filler pipe cannot be disposed in the above-mentioned preferred position. For example, there is a case that the lower end of the filler pipe is connected to the lower space of the tank main body (see JP-A-2001-30773, JP-A-2001-80372).

Figure 6:
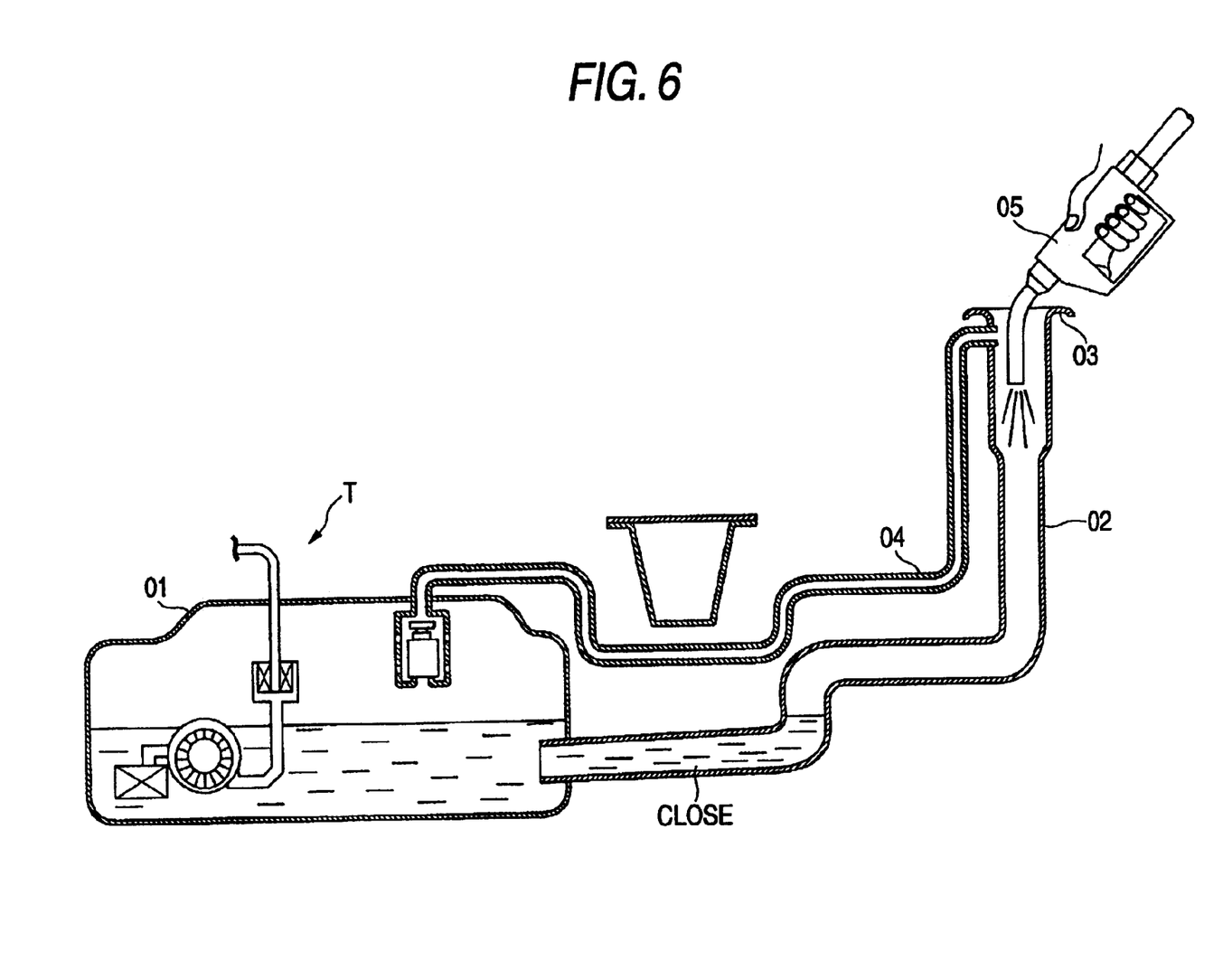
FIG. 6 is a section view of the structure of a conventional fuel tank for an automobile; and, FIG. 7 is an explanatory view of the conventional fuel tank for an automobile, showing a fuel supply operation thereof.

FIG. 6 shows the above-mentioned conventional fuel tank T. In this tank T, in the upper end of a filler pipe 02 which extends obliquely upwardly from the lower space of a tank main body 01, there is formed a fuel supply opening 03.

The upper space of the tank main body 01 is connected to the neighboring portion of the fuel supply opening 03 of the filler pipe 02 by a breather pipe 04. Since the lower end of the filler pipe 02 is connected to the lower space of the tank main body 01, when the fuel liquid surface of the tank main body 01 is present at a given height, the lower portion of the filler pipe 02 is closed by the fuel. Such closed state can occur not only in a case where the filler pipe 02 has such a bent shape as to extend horizontally from the upper space of the tank main body 01 and then extend upwardly, but also in a case where the fuel is caused to stay in the bent portion of the filler pipe 02 due to the inclination of the road on which an automobile is stopping.

Figure 7:
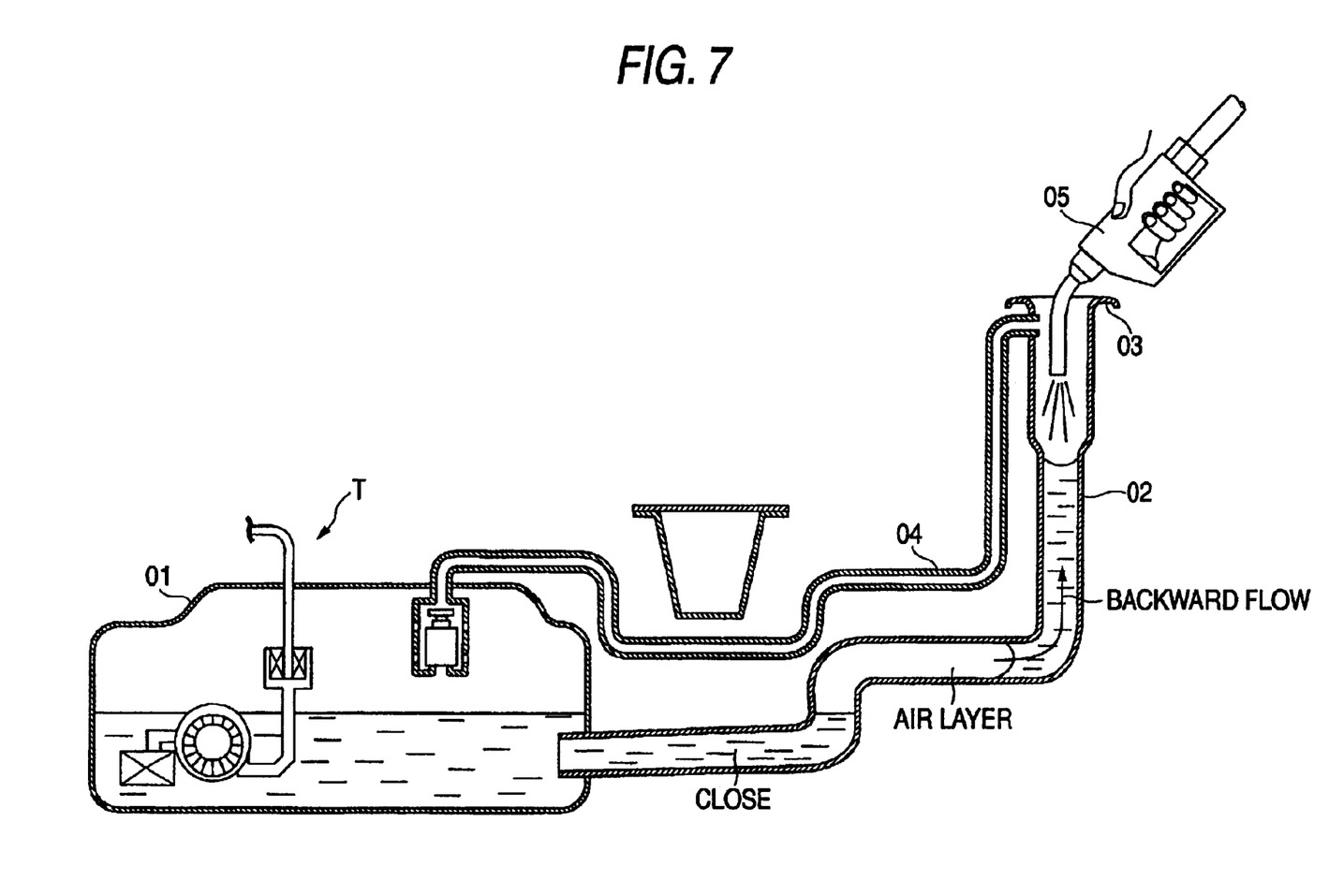

In the closed (partially filled) state of the filler pipe 02, in case where an fuel supply nozzle 05 is inserted into the fuel supply opening 03 and fuel is supplied into the fuel supply opening 03 from the fuel supply nozzle 05, an air layer is confined in the middle portion of the filler pipe 02, that is, the air layer, which is confined there and there is nowhere it could go, flows backward. Because of this, the fuel, which is stored in the portion of the filler pipe 02 that exists upwardly of the air layer, can flow back to the fuel supply opening 03. In case where the fuel flows back to the fuel supply opening 03 in this manner, the fuel is applied over the nozzle of the fuel supply nozzle 05 to thereby operate the automatic stop mechanism of the fuel supply nozzle 05, which makes it impossible to supply the fuel any further.

SUMMARY OF THE INVENTION

The present invention aims at eliminating the drawbacks found in the above-mentioned conventional fuel tanks. Accordingly, it is an object of the invention to provide a fuel tank for an automobile which, even in case where a filler pipe is in part closed by fuel while supplying the fuel, is able to supply the fuel smoothly.

In attaining the above object, according to a first aspect of the invention, there is provided a fuel tank for an automobile, comprising: a tank main body for storing fuel therein; a filler pipe for supplying fuel to the tank main body; and, a first breather pipe for connecting the upper space of the tank main body to the neighboring portion of a fuel supply opening formed in the upper end portion of the filler pipe. When the fuel liquid surface of the tank main body exists at a given height, at least part of the filler pipe is closed by the fuel. The position of the filler pipe existing nearer to the fuel supply opening side than the portion thereof to be closed by the fuel is connected to the neighboring portion of the fuel supply opening by a second breather pipe.

According to the above structure, the position of the filler pipe existing nearer to the fuel supply opening side than the portion thereof to be closed by the fuel is connected to the neighboring portion of the fuel supply opening by the second breather pipe. Thanks to this, even in case where the air layer is confined between the fuel supplied from the fuel supply nozzle inserted into the fuel supply opening and the closed portion of the filler pipe, the air layer can be escaped to the fuel supply opening through the second breather pipe, which can restrict the flow-back of the fuel together with the air layer to thereby prevent the wrong operation of the automatic stop mechanism of the fuel supply nozzle. In case where the fuel liquid surface of the tank main body rises as the fuel is supplied, the air layer existing in the upper space of the tank main body is discharged to the fuel supply opening through the first breather pipe, so that the fuel from the fuel supply nozzle can be supplied to the tank main body smoothly.

Also, according to a second aspect of the invention, there is provided a fuel tank for an automobile in which, in addition to the structure employed in the first aspect of the invention, there is formed a gas/liquid separation chamber in the second breather pipe.

According to the above structure, since there is formed the gas/liquid separation chamber in the second breather pipe, when the air layer confined between the fuel supplied from the fuel supply nozzle and the closed portion of the filler pipe is discharged to the fuel supply opening through the second breather pipe, even in case where the spray of the fuel flows into the interior of the second breather pipe, the spray of the fuel can be separated from the air layer in the gas/liquid separation chamber, which makes it possible to prevent the fuel from flowing back to the fuel supply opening.

Further, according to a third aspect of the invention, there is provided a fuel tank for an automobile, comprising: a tank main body for storing fuel therein; a filler pipe for supplying fuel to the tank main body; and, a first breather pipe for connecting the upper space of the tank main body to the neighboring portion of a fuel supply opening formed in the upper end portion of the filler pipe. When the fuel liquid surface of the tank main body exists at a given height, at least part of the filler pipe is closed by the fuel. The position of the filler pipe existing nearer to the fuel supply opening side than the portion thereof to be closed by the fuel is connected to the upper space of the tank main body by a second breather pipe.

According to the above structure, the position of the filler pipe existing nearer to the fuel supply opening side than the portion thereof to be closed by the fuel is connected to the upper space of the tank main body by the second breather pipe. Thanks to this, even in case where the air layer is confined between the fuel supplied from the fuel supply nozzle inserted into the fuel supply opening and the closed portion of the filler pipe, the air layer can be escaped to the upper space of the tank main body through the second breather pipe, which can restrict the flow-back of the fuel together with the air layer to thereby prevent the wrong operation of the automatic stop mechanism of the fuel supply nozzle. Also, even in case where the spray of the fuel flows into the second breather pipe, the spray of the fuel can be separated from the air layer in the upper space of the tank main body, thereby being able to omit such gas/liquid separation chamber as employed in the second aspect of the invention. In case where the fuel liquid surface of the tank main body of the fuel tank rises, the air layer in the upper space of the tank main body is discharged to the fuel supply opening through the first breather pipe, so that the fuel from the fuel supply nozzle can be supplied to the tank main body smoothly.

In the above-mentioned fuel tank according to the present invention, the filler pipe may comprise:

a lower pipe extending in a substantially horizontal direction;

a middle pipe extending in a substantially horizontal direction, having one end connected to the end of the lower pipe, and located at a position higher than said lower pipe in a vertical direction;

an upper pipe extending in a substantially vertical direction, having one end connected to the other end of said middle pipe, having the fuel supply opening at the other end thereof.

DETAILED DESCRIPTION OF THE PREFERRED EMBODIMENTS

Now, description will be given below of the mode for carrying out the invention with reference to the preferred embodiments of a fuel tank for an automobile according to the invention respectively shown in the accompanying drawings.

Figure 1:
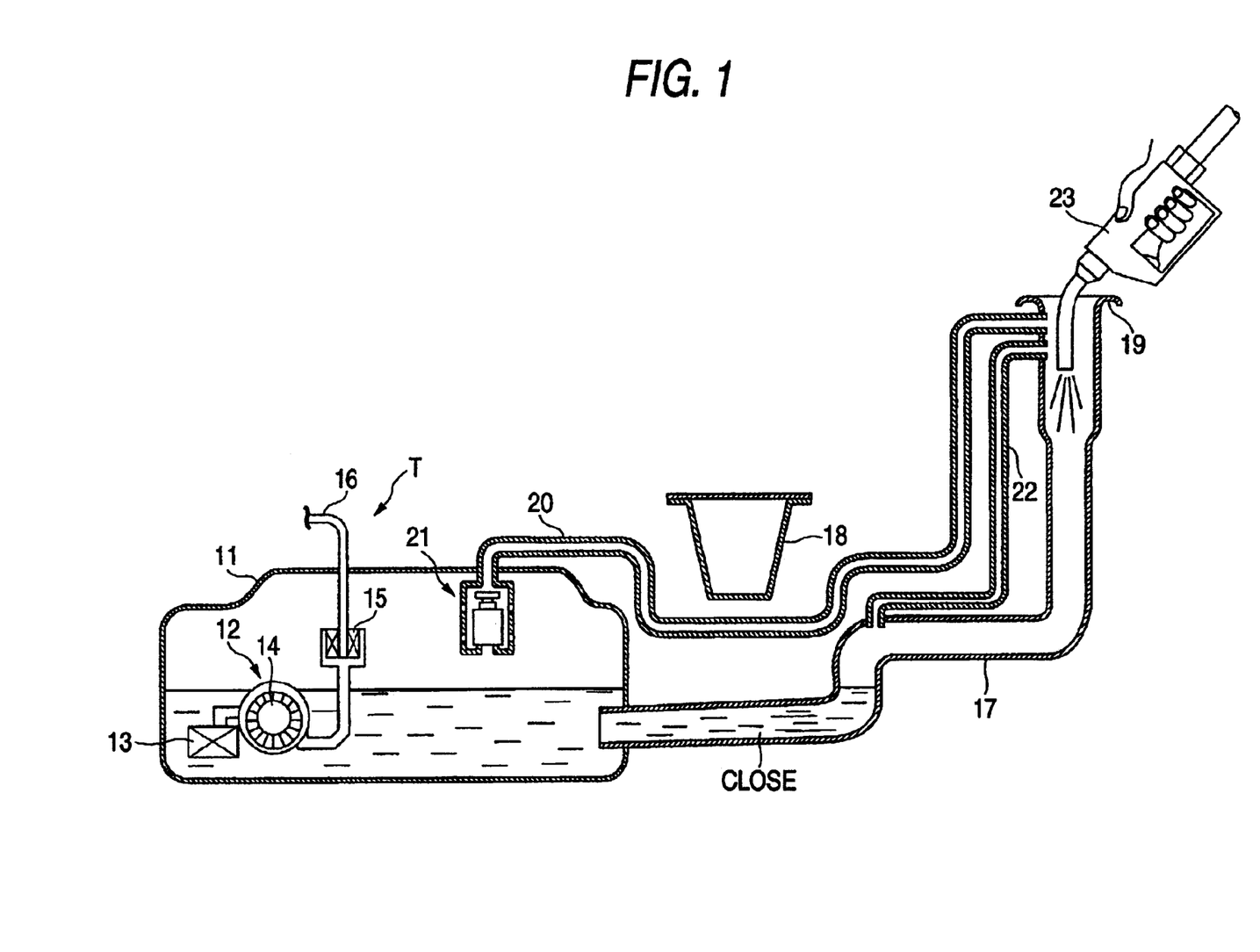
FIG. 1 is a section view of the structure of a fuel tank for an automobile according to a first embodiment of the invention.
Figure 2:
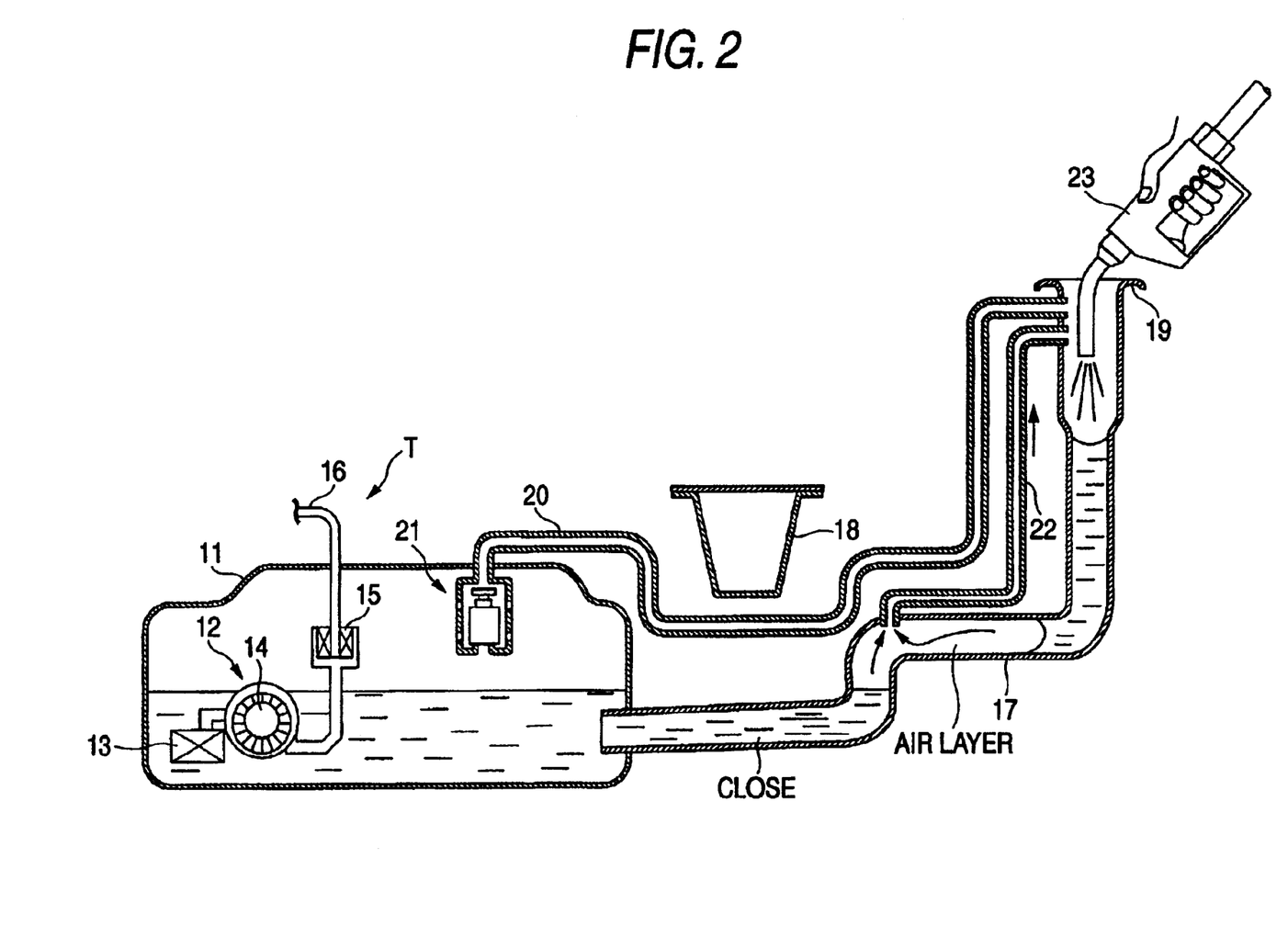
FIG. 2 is an explanatory view of an operation to be executed during fuel supply in the first embodiment.
Figure 3:
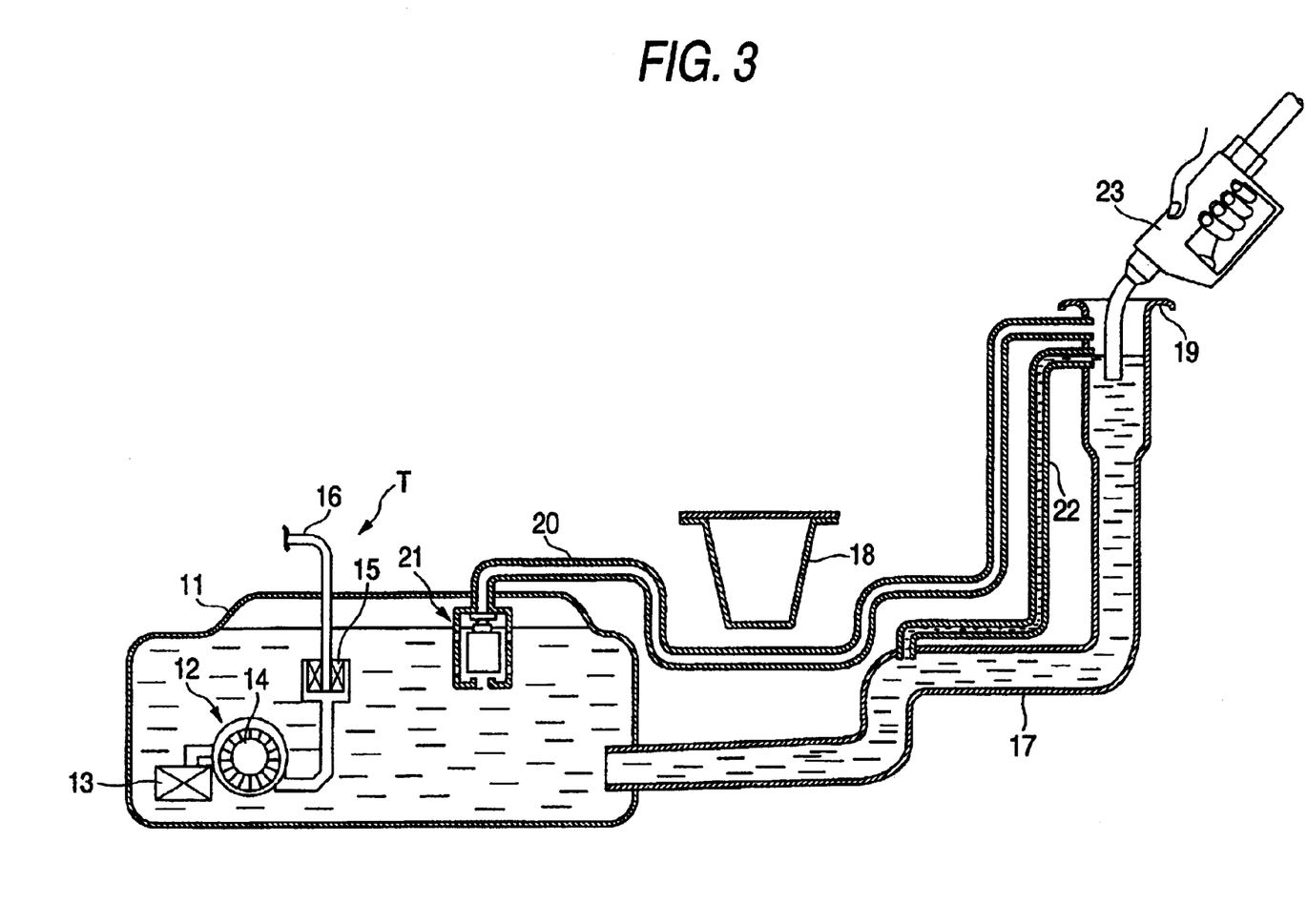
FIG. 3 is an explanatory view of the operation of the first embodiment to be executed when an automatic stop mechanism is in operation in the first embodiment.

FIGS. 1 to 3 show a first embodiment of a fuel tank for an automobile according to the invention. Specifically, FIG. 1 is a section view of the structure of a fuel tank for an automobile, FIG. 2 is an explanatory view of an operation to be executed during supply of fuel, and FIG. 3 is an explanatory view of the operation of the first embodiment to be executed when an automatic stop mechanism is in operation.

As shown in FIG. 1, a fuel tank T used in an automobile comprises an in-tank type pump unit 12 stored in the interior of a tank main body 11. The pump unit 12 comprises a strainer 13, a fuel pump 14 and a filter 15. The pump unit 12 supplies fuel stored within the tank main body 11 to an engine (not shown) through a feed pipe 16. A filler pipe 17 is used to supply fuel to the tank main body 11. The filler pipe 17 originally should extend upwardly from the upper space of the tank main body 11 but, in fact, in order to avoid its interference with an automobile body frame 18, extends upwardly from the lower space of the tank main body 11. The upper space of the tank main body 11 and the neighboring portion of a fuel supply opening 19 formed in the upper end of the filler pipe 17 are connected to each other by a first breather pipe 20. In the upper space of the tank main body 11, there is disposed a float valve 21 which is used to open and close the upstream end of the first breather pipe 20. In case where the fuel liquid surface within the tank main body 11 reaches a full fuel liquid surface, the float valve 21 is opened to thereby cut off communication between the upper space of the tank main body 11 and first breather pipe 20. And, the middle portion of the filler pipe 17 is connected to the neighboring portion of the fuel supply opening 19 formed in the upper end of the filler pipe 17 by a second breather pipe 22.

In the above-structured fuel tank T, since the filler pipe 17 is connected to the lower space of the tank main body 11, when the fuel liquid surface within the tank main body 11 reaches a given height, part of the filler pipe 17 adjacent to the tank main body 11 is closed by the fuel. In this closed state, as shown in FIG. 2, when fuel is supplied to the filler pipe 17 from a fuel supply nozzle 23 inserted into the fuel supply opening 19, even in case where an air layer is confined in the middle portion of the filler pipe 17, the air layer is discharged through the second breather pipe 22 to the neighboring portion of the fuel supply opening 19, which can avoid a possibility that the fuel stored in the portion of the filler pipe 17 existing upwardly of the air layer can flow back to the fuel supply opening 19. This not only can prevent the fuel being supplied from flowing back but also can prevent the wrong operation of the automatic stop mechanism of the fuel supply nozzle 23 due to the flowed-back fuel.

Since the air layer existing within the filler pipe 17 is discharged through the second breather pipe 22 in this manner, the fuel supplied from the fuel supply nozzle 23 is allowed to flow into the tank main body 11 smoothly. As the fuel liquid surface within the tank main body 11 rises, the air layer existing in the upper space of the tank main body 11 is discharged to the neighboring portion of the fuel supply opening 19 through the float valve 21, which is opened, and through the first breather pipe 20. And, as shown in FIG. 3, in case where the fuel liquid surface within the tank main body 11 reaches the full fuel liquid surface, the float valve 21 is closed to thereby prevent the fuel liquid surface within the tank main body 11 from rising any further. Accordingly, the fuel liquid surface within the filler pipe 17 rises to reach the height of the nozzle leading end of the fuel supply nozzle 23, thereby being able to operate the automatic stop mechanism positively.

By the way, in case where the second breather pipe 22 according to the above-mentioned first embodiment is made of a fine pipe, when the air layer within the filler pipe 17 flows vigorously within the second breather pipe 22 toward the fuel supply opening 19, there is a possibility that the spray of the fuel can flow back to the fuel supply opening 19 together with the air layer or the flowed-back fuel can operate the automatic stop mechanism of the fuel supply nozzle 23 in error.

Figure 4:
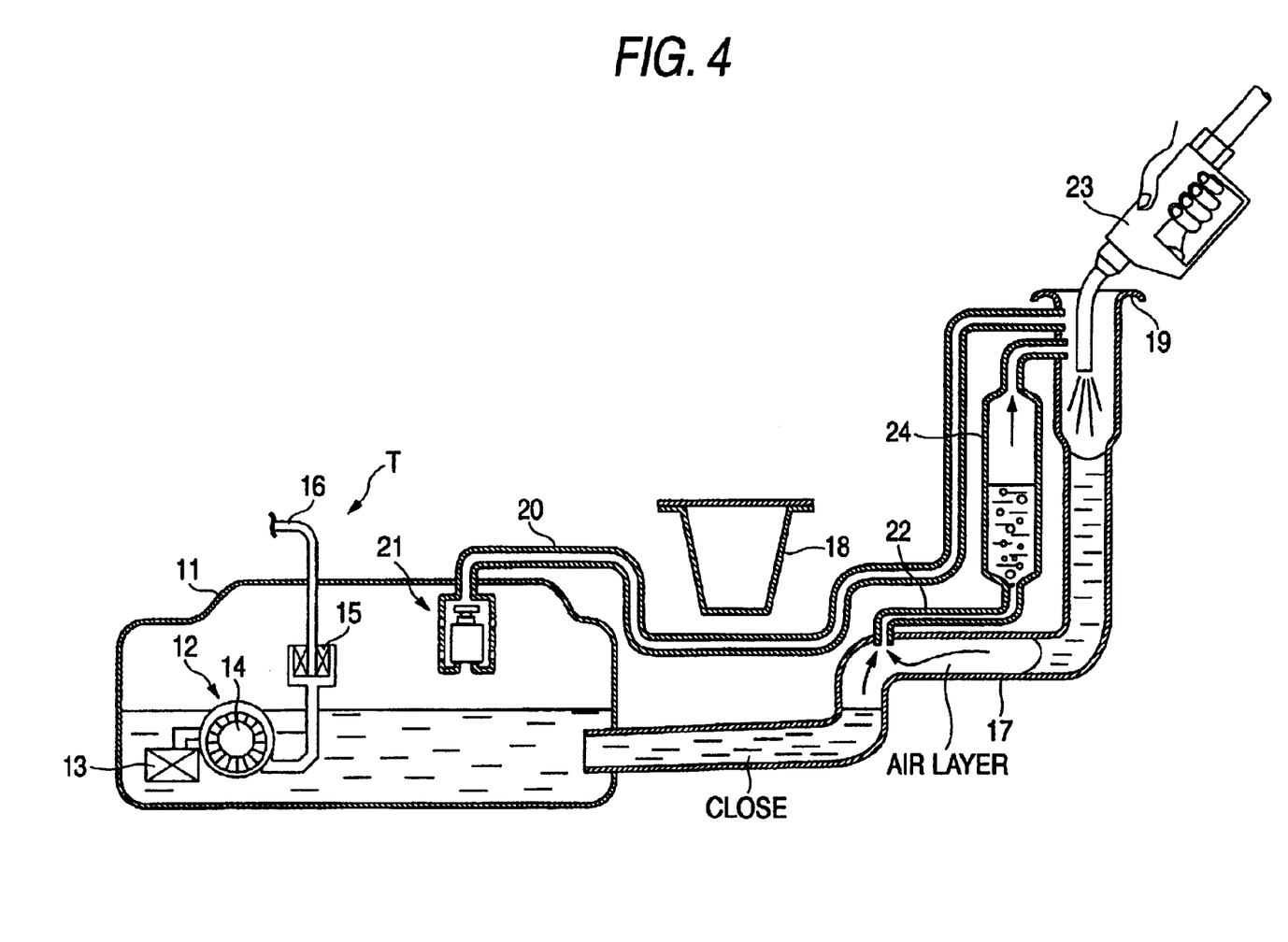
FIG. 4 is a section view of the structure of a fuel tank for an automobile according to a second embodiment of the invention, corresponding to FIG. 2.

In view of the above, according to a second embodiment of the invention shown in FIG. 4, the capacity of the middle portion of the second breather pipe 22 is enlarged to thereby form a gas/liquid separation chamber 24. Due to such formation of the gas/liquid separation chamber 24 in the middle portion of the second breather pipe 22, when the air layer within the filler pipe 17 flows within the second breather pipe 22 toward the fuel supply opening 19, the flow speed of the air layer can be reduced in the gas/liquid separation chamber 24 and the fuel spray contained in the air layer can be separated from the air layer, so that only the air layer can be discharged from the fuel supply opening 19. Thus, according to the second embodiment of the invention, it is possible to prevent further positively not only the spray of the fuel from flowing back to the fuel supply opening 19 together with the air layer but also the flowed-back fuel from operating the automatic stop mechanism of the fuel supply nozzle 23 in error.

Figure 5:
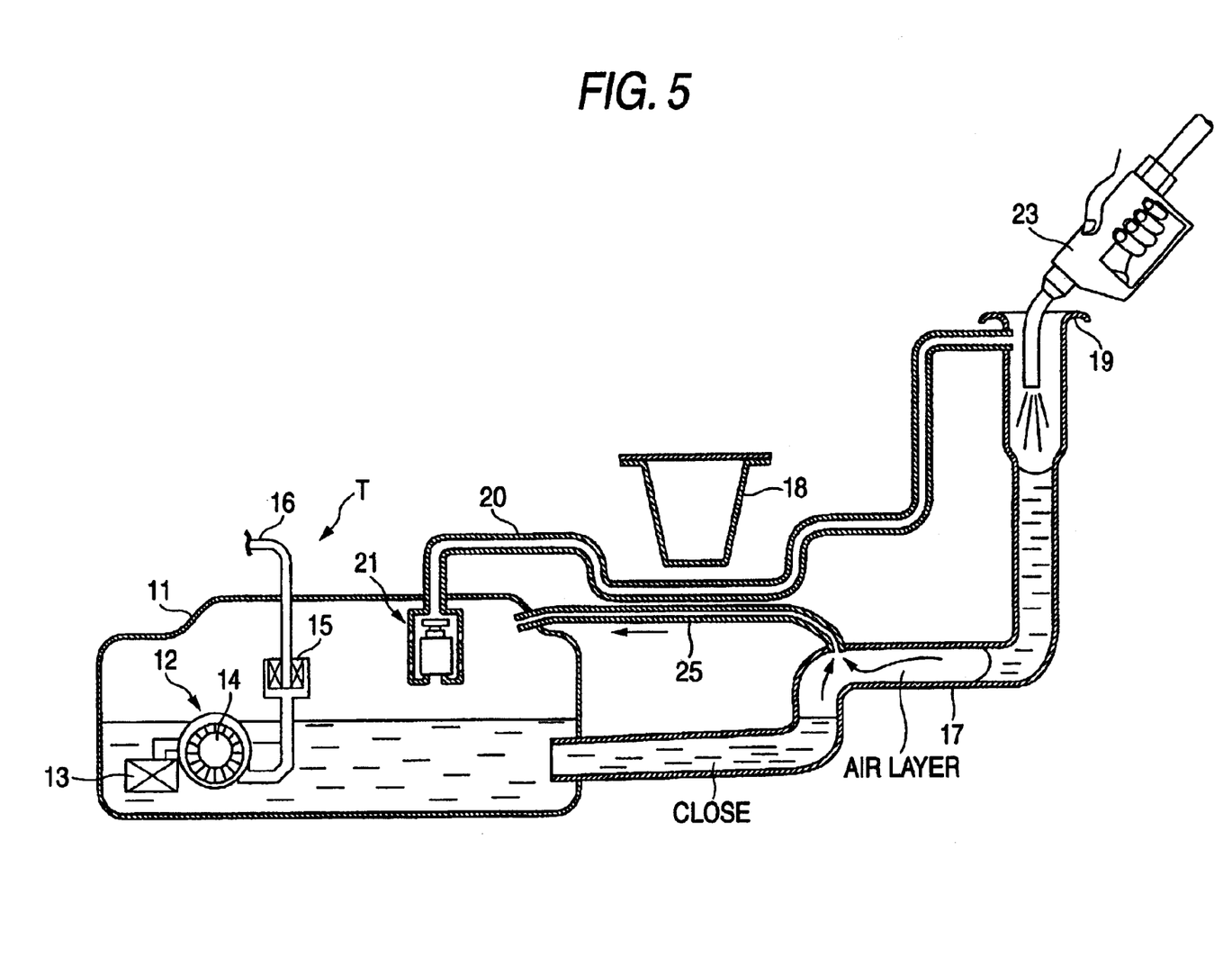
FIG. 5 is a section view of the structure of a fuel tank for an automobile according to a third embodiment of the invention, corresponding to FIG. 2.

Next, description will be given below of a third embodiment of a fuel tank for an automobile according to the invention with reference to FIG. 5.

Here, in the first and second embodiments, the second breather pipe 22 connects together the middle portion of the filler pipe 17 and the neighboring portion of the fuel supply opening 19; and, on the other hand, in the third embodiment, a second breather pipe 25 is used to connect the middle portion of the filler pipe 17 to the upper space of the tank main body 11.

Therefore, when fuel is supplied to the filler pipe 17 from the fuel supply nozzle 23 inserted into the fuel supply opening 19, even in case where the air layer is confined in the middle portion of the filler pipe 17, the air layer is discharged through the second breather pipe 25 to the upper space of the tank main body 11. Accordingly, it is possible to avoid a fear that the fuel stored in the portion of the filler pipe 17 existing upwardly of the air layer can flow back to the fuel supply opening 19. This not only can prevent the fuel from flowing back while the fuel is being supplied but also can prevent the wrong operation of the automatic stop mechanism of the fuel supply nozzle 23 due to the flowed-back fuel. The air layer, which has been discharged to the upper space of the tank main body 11, can be discharged through the first breather pipe 20 to the neighboring portion of the fuel supply opening 19 without any trouble.

However, even in case where the spray of the fuel flows into the second breather pipe 25 together with the air layer of the middle portion of the filler pipe 17, since the spray of the fuel can be separated from the air layer in the upper air space of the tank main body 11, the gas/liquid separation chamber employed in the second embodiment is not necessary.

In the above first to third embodiments, the positions for connecting the second breather pipes 22, 25 to the filler pipe 17, preferably, may be as high as possible in the vicinity of the position where the liquid and air layers are separated from each other.

Although description has been given hereinbefore in detail of the respective illustrated embodiments of the invention, other various changes in design are also possible without departing from the subject matter of the invention.

As has been described heretofore, according to a fuel tank for an automobile as set forth in the first aspect of the invention, the position of the filler pipe existing nearer to the fuel supply opening side than the portion thereof to be closed by the fuel is connected to the neighboring portion of the fuel supply opening by the second breather pipe. Thanks to this, even in case where the air layer is confined between the fuel supplied from the fuel supply nozzle inserted into the fuel supply opening and the closed portion of the filler pipe, the air layer can be escaped to the fuel supply opening through the second breather pipe, which can restrict the flow-back of the fuel together with the air layer to thereby prevent the wrong operation of the automatic stop mechanism of the fuel supply nozzle. In case where the fuel liquid surface of the tank main body rises as the fuel is supplied, the air layer existing in the upper space of the tank main body is discharged to the fuel supply opening through the first breather pipe, so that the fuel from the fuel supply nozzle can be supplied to the tank main body smoothly.

While there has been described in connection with the preferred embodiments of the present invention, it will be obvious to those skilled in the art that various changes and modifications may be made therein without departing from the present invention, and it is aimed, therefore, to cover in the appended claim all such changes and modifications as fall within the true spirit and scope of the present invention.

Also, according to a fuel tank for an automobile as set forth in the second aspect of the invention, since there is formed the gas/liquid separation chamber in the second breather pipe, when the air layer is confined between the fuel supplied from the fuel supply nozzle and the closed portion of the filler pipe is discharged to the fuel supply opening through the second breather pipe, even in case where the spray of the fuel flows into the interior of the second breather pipe, the spray of the fuel can be separated from the air layer in the gas/liquid separation chamber, which makes it possible to prevent the fuel from flowing back to the fuel supply opening.

Further, according to a fuel tank for an automobile as set forth in the third aspect of the invention, the position of the filler pipe existing nearer to the fuel supply opening side than the portion thereof to be closed by the fuel is connected to the upper space of the tank main body by the second breather pipe. Thanks to this, even in case where the air layer is confined between the fuel supplied from the fuel supply nozzle inserted into the fuel supply opening and the closed portion of the filler pipe, the air layer can be escaped to the upper space of the tank main body through the second breather pipe, which can restrict the flow-back of the fuel together with the air layer to thereby prevent the wrong operation of the automatic stop mechanism of the fuel supply nozzle. Also, even in case where the spray of the fuel flows into the second breather pipe, the spray of the fuel can be separated from the air layer in the upper space of the tank main body, thereby being able to omit such gas/liquid separation chamber as employed in the second aspect of the invention. In case where the fuel liquid surface of the tank main body of the fuel tank rises, the air layer in the upper space of the tank main body is discharged to the fuel supply opening through the first breather pipe, so that the fuel from the fuel supply nozzle can be supplied to the tank main body smoothly.

What is claimed is:

1. A fuel tank for an automobile, comprising:
a tank main body storing fuel therein;
a filler pipe through which fuel is supplied to said tank main body, said filler pipe having a fuel supply opening formed at an upper end portion thereof;
a first breather pipe connecting an upper space of said tank main body to a neighboring portion of the fuel supply opening of said filler pipe; and
a second breather pipe connects a first portion of said filler pipe and a second portion of the filler pipe in a bypass-manner, wherein, when a filet liquid surface of said tank main body exists at a given height, at least part of said filler pipe is closed by said fuel, and wherein said first portion exists nearer to the side of said fuel supply opening than a portion thereof to be closed by said fuel, and said second portion is located close to said fuel supply opening.

2. A fuel tank for an automobile as set forth in claim 1, wherein said second breather pipe (22) comprises a gas/liquid separation chamber (24).

3. A fuel tank for an automobile as set forth in claim 1, wherein said filler pipe (17) comprising:
   a lower pipe (LP) extending in a substantially horizontal direction;
   a middle pipe (MP) extending in a substantially horizontal direction, having one end (MP-E1) connected to the end (LP-E1) of the lower pipe (LP), and located at a position higher than said lower pipe (LP) in a vertical direction;
   an upper pipe (UP) extending in a substantially vertical direction, having one end (UP-1) connected to the other end (MP-E2) of said middle pipe (MP), having the other end (UP-E2) at which said fuel supply is provided.

4. A fuel tank for an automobile as set forth in claim 3, wherein said first portion (FP) is located at said middle pipe (MP).

5. A fuel tank for an automobile as set forth in claim 4, wherein, when the fuel liquid surface of said tank main body (11) exists at the given height, at least said lower pipe (LP) of said filler pipe (17) is filled with said fuel.

6. A fuel tank for an automobile, comprising:
   a tank main body storing fuel therein;
   a filler pipe through which fuel is supplied to said tank main body, said filler pipe having a fuel supply opening formed at an upper end portion thereof,
   a first breather pipe connecting an upper space of said tank main body to a neighboring portion of the fuel supply opening of said filler pipe; and
   a second breather pipe connects a first portion and a second portion in a bypass-manner, wherein, when a fuel liquid surface of said tank main body exists at a given height, at least part of said filler pipe is closed by said fuel, and wherein said first portion is formed on said filler pipe and exists nearer to the side of said fuel supply opening than a portion thereof to be closed by said fuel, and said second portion is communicated with said fuel supply opening so as to release an air existed near the portion to be closed by the fuel.

7. A fuel tank for an automobile as set forth in claim 6, wherein said second portion is located on the filler pipe, and close to said fuel supply opening.

8. A fuel tank for an automobile as set forth in claim 7, wherein said second breather pipe comprises a gas/liquid separation chamber.

9. A fuel tank for an automobile as set forth in claim 7, wherein said filler pipe comprising:
   a lower pipe extending in a substantially horizontal direction;
   a middle pipe extending in a substantially horizontal direction, having one end connected to the end of the lower pipe, and located at a position higher than said lower pipe in a vertical direction;
   an upper pipe extending in a substantially vertical direction, having one end connected to the other end of said middle pipe, having the other end at which said fuel supply is provided.

10. A fuel tank for an automobile as set forth in claim 9, wherein said first portion is located at said middle pipe.

11. A fuel tank for an automobile as set forth in claim 10, wherein when the fuel liquid surface of said tank main body exists at the given height, at least said lower pipe of said filler pipe is filled with said fuel.

12. A fuel tank for an automobile as set forth in claim 6, wherein said second portion is said upper space of said tank main body.

* * * * *